(12) United States Patent
Ochs et al.

(10) Patent No.: US 11,327,090 B2
(45) Date of Patent: May 10, 2022

(54) REUSE OF DISPENSERS DURING ALIGNMENT PROCEDURES

(71) Applicant: HEWLETT-PACKARD DEVELOPMENT COMPANY, L.P., Spring, TX (US)

(72) Inventors: David H. Ochs, Corvallis, OR (US); Kenneth Ward, Corvallis, OR (US)

(73) Assignee: Hewlett-Packard Development Company, L.P., Spring, TX (US)

(*) Notice: Subject to any disclaimer, the term of this patent is extended or adjusted under 35 U.S.C. 154(b) by 194 days.

(21) Appl. No.: 16/603,847

(22) PCT Filed: Sep. 27, 2017

(86) PCT No.: PCT/US2017/053719
§ 371 (c)(1),
(2) Date: Oct. 9, 2019

(87) PCT Pub. No.: WO2019/066804
PCT Pub. Date: Apr. 4, 2019

(65) Prior Publication Data
US 2020/0116747 A1    Apr. 16, 2020

(51) Int. Cl.
*G01N 35/10* (2006.01)
*B01L 3/00* (2006.01)

(52) U.S. Cl.
CPC .... *G01N 35/1011* (2013.01); *B01L 3/502715* (2013.01)

(58) Field of Classification Search
CPC .......... G01N 35/1011; G01N 35/1009; G01N 35/10; B01L 3/502715; B01L 3/5027; B01L 3/502; B01L 3/50

USPC .......................................................... 436/180
See application file for complete search history.

(56) References Cited

U.S. PATENT DOCUMENTS

| | | | |
|---|---|---|---|
| 6,558,623 B1 | 5/2003 | Ganz et al. | |
| 7,585,463 B2 * | 9/2009 | Austin | G01N 35/1011 422/63 |
| 7,618,589 B2 | 11/2009 | Toi et al. | |
| 8,697,012 B2 | 4/2014 | Ikushima et al. | |
| 2005/0129850 A1 | 6/2005 | Jung | |
| 2006/0070571 A1 | 4/2006 | Garcia | |
| 2007/0015289 A1 | 1/2007 | Kao et al. | |
| 2011/0311409 A1 | 12/2011 | Silverbrook | |
| 2013/0278928 A1 | 10/2013 | Mourey | |
| 2017/0080416 A1 | 3/2017 | Panetz et al. | |
| 2017/0089937 A1 | 3/2017 | Lefebvre et al. | |

OTHER PUBLICATIONS

Micro10x User Manual, Feb. 8, 2014, http://hudsonrobotics.com/images/Library_Files/Manuals/Micro10x.pdf.

* cited by examiner

*Primary Examiner* — Christine T Mui
(74) *Attorney, Agent, or Firm* — Perry + Currier Inc

(57) ABSTRACT

In example implementations, a method is provided. The method may be executed by a processor of a fluid dispensing apparatus. The method includes dispensing a fluid onto a surface from a dispenser during an alignment procedure. The surface is ejected for alignment verification. The surface is then received for re-execution of the alignment procedure after the alignment verification. The dispenser is re-used to dispense fluid onto the surface during re-execution of the alignment procedure.

12 Claims, 4 Drawing Sheets

US 11,327,090 B2

REUSE OF DISPENSERS DURING ALIGNMENT PROCEDURES

BACKGROUND

Laboratories often run experiments using various different liquids to obtain different types of experimental data. The experiments may use fluid dispensers that dispense fluid into microplates or microtiter plates to perform the various different experiments.

In some experiments, the fluids may be dispensed onto different layers on a slide or plate. A dispensing protocol may be used by the fluid dispensing apparatus that controls which fluids are dispensed in which locations.

DETAILED DESCRIPTION

Examples described herein provide an apparatus and a method for re-using a dispenser multiple times during an alignment procedure. As discussed above, fluids may be dispensed onto different locations on a slide or plate. A dispensing protocol may be used by the fluid dispensing apparatus that controls which fluids are dispensed in which locations. However, if the surface holder and the dispenser are not properly aligned, the fluids may be dispensed incorrectly leading to errors or improperly executed experiments.

Previous methods would use a manual alignment procedure where a technician may follow directions from a manual. In some instances, the alignment may be off even when the alignment procedure was executed. If the alignment procedure was re-run the dispense head could not be re-used. As a result, the alignment procedure could waste or consume many dispense heads.

Examples described herein provide an alignment procedure that is stored in memory to perform alignment of a dispenser (e.g., a cassette holder or other dispensing support) and a surface holder in a fluid dispensing apparatus. The alignment procedure is modified to hold the dispenser (e.g., a dispense head of a cassette) used during the alignment procedure rather than releasing the dispenser resulting in a new dispenser being used in a subsequent run of the alignment procedure. The alignment procedure may automatically provide the slide or microplate for examination by a user while the dispenser is being held. As a result, if the alignment procedure is run again, the same dispenser may be re-used during the alignment procedure.

Figure 1:
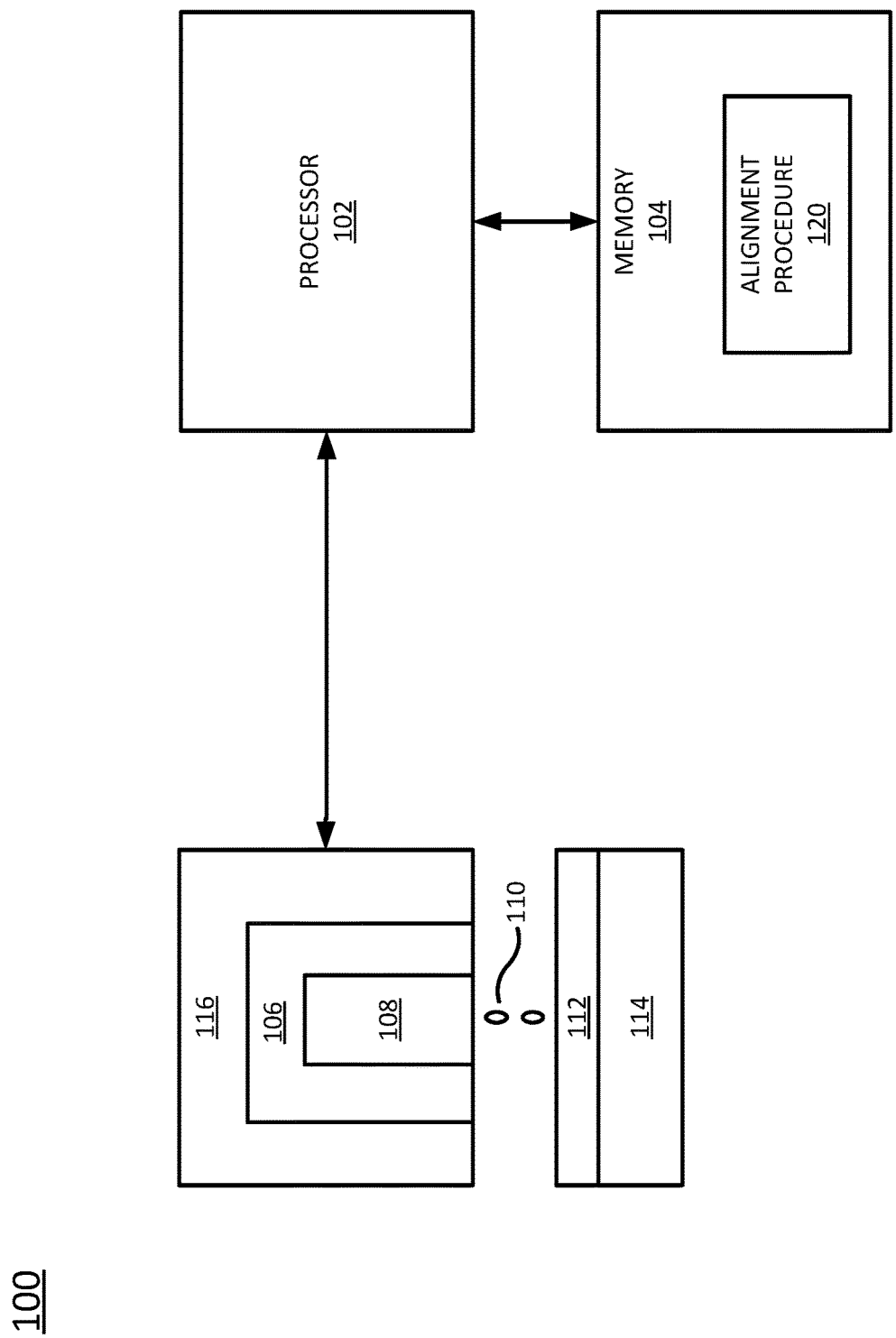
FIG. 1 is a block diagram of an example apparatus of the present disclosure.

FIG. 1 illustrates a block diagram of a fluid dispensing apparatus 100. In one example, the fluid dispensing apparatus 100 may include a processor 102, a computer readable memory 104, a dispenser 116 (also referred to as a nest) and a surface holder 114. In one example, the dispenser 116 may hold a cassette 106 and the surface holder 114 may support a surface 112.

In other examples, the dispenser 116 may be a digital pipette dispenser, or any other type of fluid dispensing system. Although the examples discussed below refer to a dispenser that is a cassette holder (e.g., that holds a cassette and a dispense head), it should be noted that the present disclosure may be used to align any type of dispenser.

The processor 102 may be communicatively coupled to the computer readable memory 104 and the dispenser 116 (e.g., a cassette holder). The processor 102 may execute instructions stored in the computer readable memory 104 (also referred to as a memory 104) and control operations of the dispenser 116 and the cassette 106. The processor 102 and the computer readable memory 104 may be internal to the fluid dispensing apparatus 100 or may be part of an external computing system/controller that controls the operation of the fluid dispensing apparatus 100.

In one example, the cassette 106 may include a dispense head 108. Although a single dispense head 108 is illustrated in FIG. 1, it should be noted that the cassette 106 may include any number of dispense heads 108. The dispense head 108 may dispense a fluid 110 onto various locations of the surface 112. The fluid 110 may be any type of fluid used for a particular dispense protocol. For example, the fluid 110 may be chemical liquids such as aqueous based compounds with optional surfactant or glycerol that is added, dimethyl sulfoxide (DMSO) based compounds, and the like.

The surface 112 may be a microplate with a plurality of wells, an experimental surface for growing a mass, a mounted paper, a surface with electronic sensors, and the like. The surface 112 may be supported by a surface holder 114. The processor 102 may control the cassette 106 and dispense head 108 to dispense the fluid 110 onto various locations of the surface 112.

In one example, the computer readable memory 104 may be a non-transitory computer readable storage medium such as a read only memory (ROM), a random access memory (RAM), a hard disk drive, and the like. In one example, the computer readable memory 104 may include an alignment procedure 120. For example, the alignment procedure 120 may be stored in persistent local memory of the fluid dispensing apparatus 100 such as ROM memory.

In one example, the alignment procedure 120 may include step-by-step instructions to align the dispenser 116 (e.g., a cassette holder) to various locations of the surface holder 114 by dispensing the fluid 110 onto selected locations on the surface 112. In one example, the alignment procedure 120 may allow a user to perform adjustments to alignment between the dispenser 116 and the surface holder 114 after performing an alignment verification, as discussed in further detail below. The alignment procedure 120 may be executed repeatedly until the dispenser 116 is properly aligned to the surface holder 114.

In one example, the alignment procedure 120 of the present disclosure may hold the cassette 106 while the surface 112 is ejected for alignment verification. Said another way, the cassette 106 and the dispense head 108 in the cassette 106 may remain connected within the fluid dispensing apparatus 100 when the surface 112 is ejected for alignment verification. As a result, if the alignment procedure 120 is executed again after making adjustments to the alignment between the dispenser 116 and the surface holder 114, the same dispense head 108 can be re-used.

In contrast, previous alignment procedures would release the dispense head inside the cassette, and possibly the cassette itself, for alignment verification and then use a new dispense head for subsequent runs of the alignment procedure. As a result, multiple dispense heads may be used if the alignment procedure was executed multiple times to complete the alignment of the cassette to the surface holder. This may lead to additional costs related to excessive usage of dispense heads.

Unlike the previous alignment procedures, the alignment procedure 120 is executed such that the cassette 106 and the dispense head 108 are not released. As noted above, the cassette 106 and the dispense head 108 are held, and the same dispense head 108 can be re-used for any number of runs of the alignment procedure 120. In other words, the alignment procedure 120 can be executed repeatedly with a single dispense head 108.

It should be noted that FIG. 1 has been simplified for ease of explanation. For example, the fluid dispensing apparatus 100 may include additional components that are not illustrated. For example, the cassette 106 may include a movable platform, the dispense head 108 may include a reservoir and a nozzle, and fluid dispensing apparatus 100 may include a platform to support the surface 112, a housing, and the like.

Figure 2:
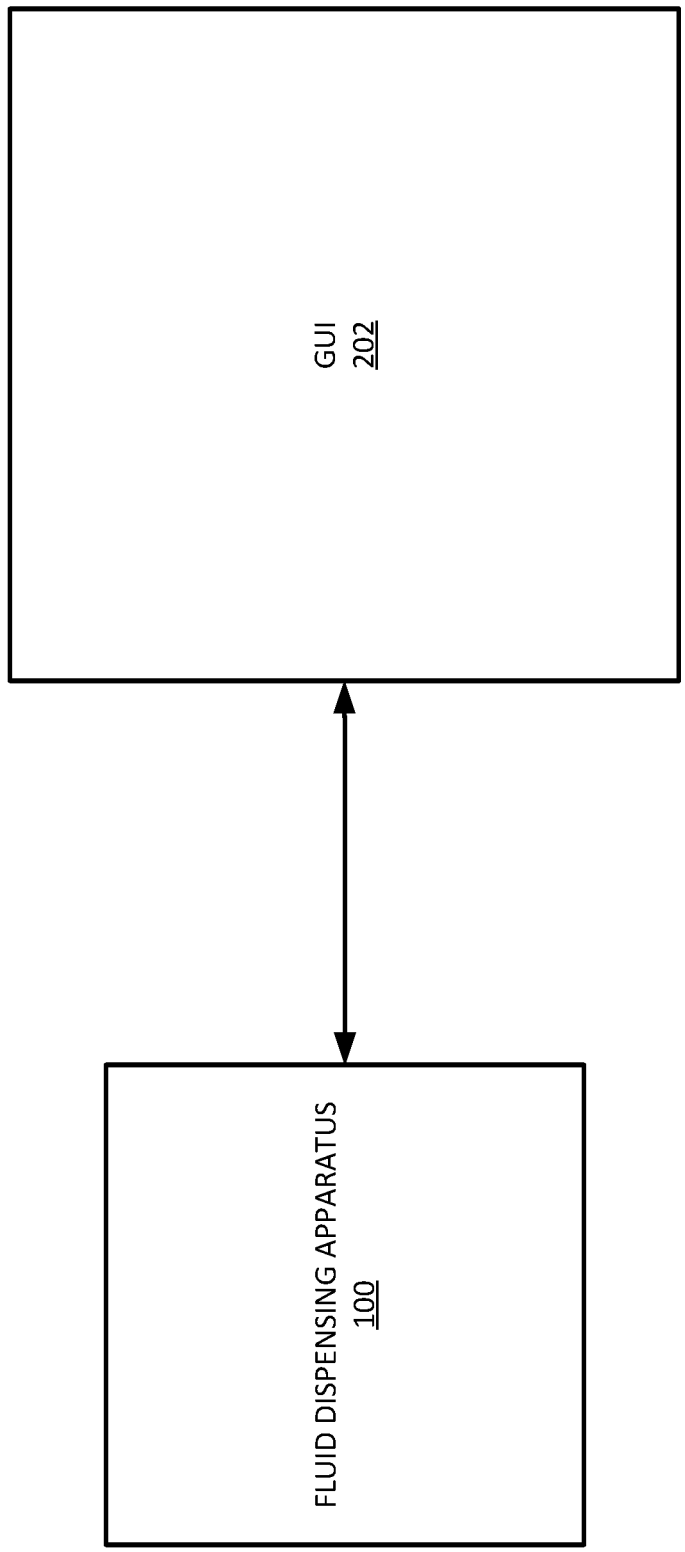
FIG. 2 is another block diagram of an example apparatus of the present disclosure.

FIG. 2 illustrates another block diagram of the fluid dispensing apparatus 100 with a graphical user interface (GUI) 202. In one example, the GUI 202 may receive inputs and provide outputs during the alignment procedure 120. In one example, the GUI 202 may be a touchscreen interface, and a user may provide inputs via touch selections. In another example, the GUI 202 may receive inputs via external input/output devices such as a mouse, touch pad, and the like.

In one example, the GUI 202 may provide an option to start the alignment procedure 120 stored in the computer readable memory 104. For example, the option may be provided as a button or through a series of selectable menus.

The GUI 202 may ask for input before the alignment procedure 120 begins. For example, the input may include a type of surface 112, a size or dimensions (e.g., a length and a width) of the surface 112, dimensions of wells (if applicable), which locations should be used for the alignment procedure 120, what type of fluid 110 is being used, and the like.

In one example, the locations that receive fluids on the surface 112 may be based on the type of surface 112. In other words, the locations on the surface 112 that are used for the alignment procedure 120 may be automatically selected, rather than manual inputted via the GUI 202, based on the type of surface 112 that is used. For example, a microplate with a plurality of wells may use wells located on four corners of the microplate, or an experimental surface may use locations within the experimental surface that may be growing a bio-mass, and the like.

Once the alignment procedure 120 begins, the GUI 202 may provide outputs as the dispense head 108 is dispensing the fluid 110 onto a plurality of different locations on the surface 112. The outputs may include information such as a current progress of the alignment procedure 120, a current dispensing location on the surface 112, and the like.

After the alignment procedure 120 is executed, the surface 112 may be ejected from the fluid dispensing apparatus 100 for alignment verification. As noted above, the cassette 106 may be held (e.g., not released) while the surface 112 is ejected and being examined for alignment verification. The GUI 202 may provide options to provide input to determine whether the alignment procedure 120 was successful or if the alignment procedure 120 will be executed again.

In one example, if the alignment procedure 120 is executed again, the GUI 202 may provide options to adjust dispense locations of the dispense head 108 relative to the surface 112 based on the alignment verification. The adjustments may be provided, and the GUI 202 may provide an option to start the alignment procedure 120 again. The option may generate an indication for the processor 102 to repeat the alignment procedure 120 with the received adjustments to the dispenser 116 and the dispense head 108.

In another example, the adjustments may be physical adjustments to components within the fluid dispensing apparatus 100. For example, an adjustment screw or a dial of a carriage that moves the dispenser 116 or the surface holder 114 may be turned or adjusted.

As noted above, when the alignment procedure 120 is executed again, the same dispense head 108 may be re-used. In other words, the dispense head 108 is not replaced with a new dispense head 108. Said another way, a single dispense head 108 may be re-used for each run of the alignment procedure 120.

In one example, the alignment procedure 120 may be repeated with the same dispense head 108 until the dispense head 108 is properly aligned relative to the surface 112. The GUI 202 may receive a confirmation (e.g., a displayed confirmation button, a menu selection, and the like) that the alignment procedure is complete. Then the cassette 106 may be released and the dispense head 108 may be replaced with a new cassette with new dispense heads used for an experimental dispense protocol.

Figure 3:
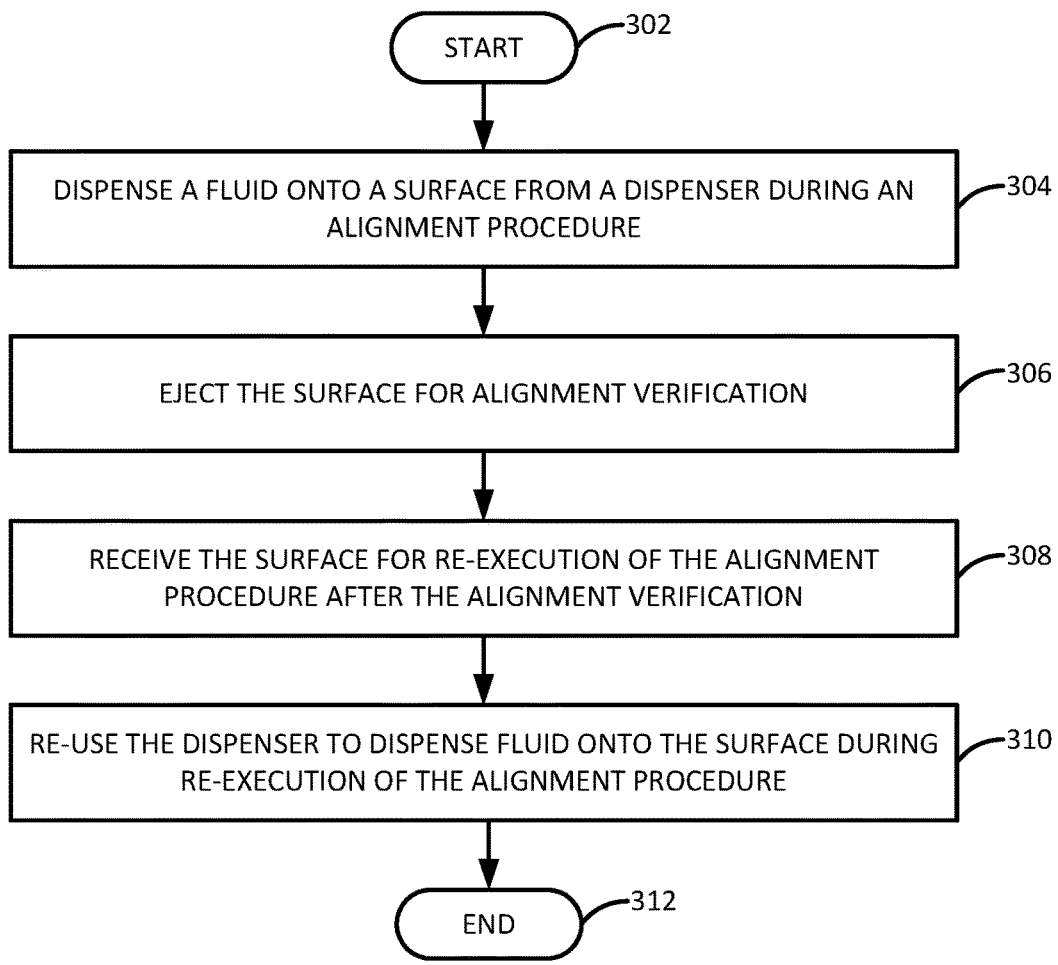
FIG. 3 is a flow chart of an example method for aligning a dispenser.

FIG. 3 illustrates a flow diagram of an example method 300 for aligning a dispenser (e.g., a dispense head). In one example, the method 300 may be performed by the fluid dispensing apparatus 100.

At block 302, the method 300 begins. At block 304, the method 300 dispenses a fluid onto a surface from a dispenser (e.g., a dispense head of a cassette) during an alignment procedure. For example, the alignment procedure may be executed to align the cassette holder relative to the surface holder such that the fluid is accurately dispensed at desired locations of the surface.

At block 306, the method 300 ejects the surface for alignment verification. After the fluid is dispensed onto certain locations that are provided by the user, or selected automatically based on the surface type, the surface may be ejected for the alignment verification. Ejection of the surface may include providing access to the surface. For example, a door may be opened, the surface may be ejected through an opening or a slot, a barrier, or an arm, may be moved to allow the surface to be removed, and the like.

As noted above, when the surface is ejected for alignment verification, the cassette of the dispenser may be held. In other words, the cassette is not released such that the same cassette and dispense head can be re-used if the alignment procedure is repeated.

At block 308, the method 300 receives the surface for re-execution of the alignment procedure after the alignment verification. For example, the alignment may still be off and the alignment procedure may be re-executed. Adjustments to the positioning of the cassette holder, cassette, and/or the dispense head relative to the surface holder may be provided before the alignment procedure is re-executed.

At block 310, the method 300 re-uses the dispenser (e.g., the dispense head of the cassette) to dispense fluid onto the surface during re-execution of the alignment procedure. In other words, the same dispenser (e.g., dispense head) may be used to perform subsequent runs of the alignment procedure. Unlike previous methods, the present disclosure may allow a single dispense head to be used for each run of the alignment procedure without being removed or replaced.

After executing the alignment procedure and the alignment verification confirms that the cassette holder is properly aligned to the surface holder, a confirmation may be received that the alignment procedure is complete. The cassette may be released. Then the cassette may be removed with a new cassette head and dispense heads that are used for an experimental dispensing protocol. At block 312, the method 300 ends.

Figure 4:
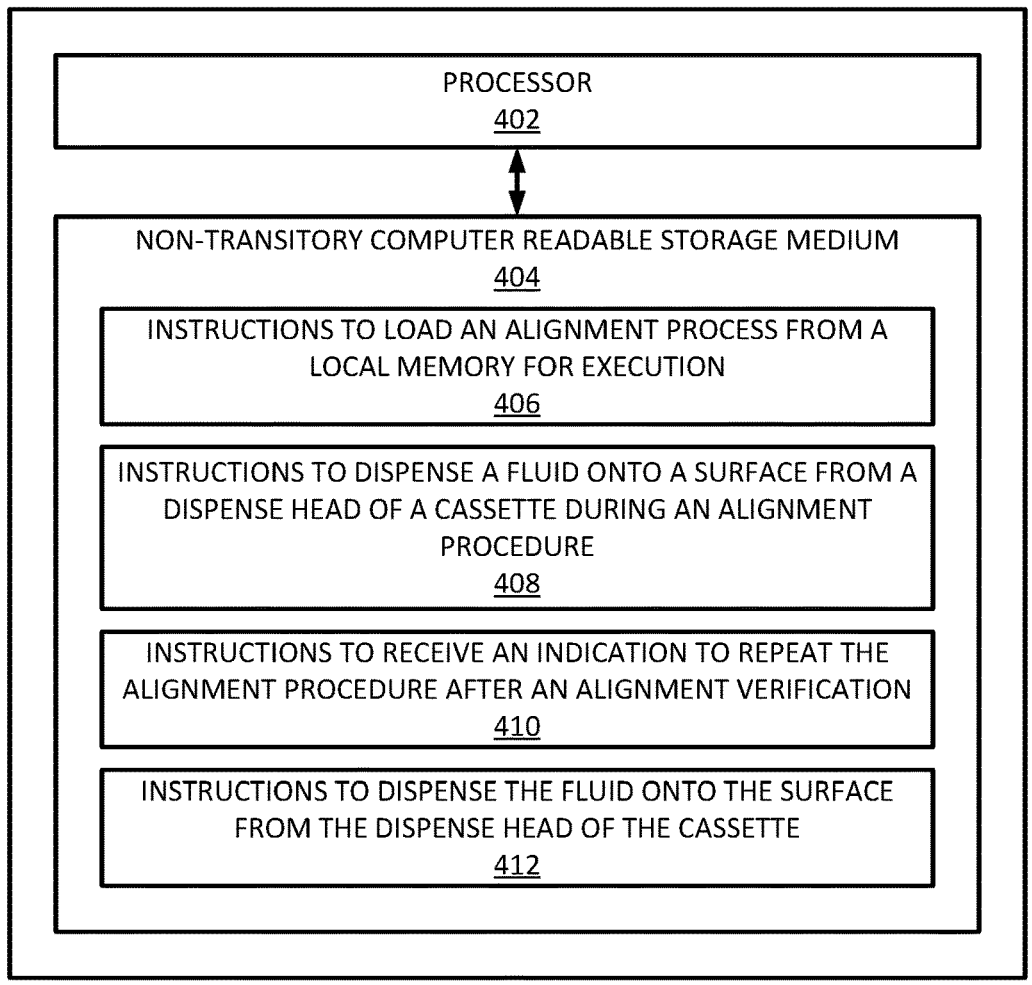
FIG. 4 is a block diagram of an example non-transitory computer readable storage medium storing instructions executed by a processor.

FIG. 4 illustrates an example of an apparatus 400. In one example, the apparatus 400 may be the fluid dispensing apparatus 100. In one example, the apparatus 400 may include a processor 402 and a non-transitory computer readable storage medium 404. The non-transitory computer readable storage medium 404 may include instructions 406, 408, 410, and 412 that when executed by the processor 402, cause the processor 402 to perform various functions.

The instructions 406 may include instructions to load an alignment process from a local memory for execution. For example, the alignment process may be stored in the local memory. The alignment process may provide step-by-step instructions for executing the alignment process via GUI.

In one example, the alignment process may initialize by collecting information from a user. The information may include inputs such as a type of surface being used (e.g., a microplate with a plurality of wells, an experimental surface, a mounted paper, a surface with electronic sensors, and the like), dimensions of the surface, locations used for the alignment procedure, and the like.

The instructions 408 may include instructions to dispense a fluid onto a surface from a dispense head of a cassette during an alignment procedure. In one example, the fluid may be dispensed onto the surface at locations that are determined based on the type of surface that is used. In another example, the locations that the fluid is dispensed onto may be based on locations provided by the user via the GUI.

The instructions 410 may include instructions to receive an indication to repeat the alignment procedure after an alignment verification. For example, the surface may be provided to the user to perform the alignment verification after the alignment procedure is completed. Providing the surface may include ejecting the surface, opening an access way for the surface, presenting the surface to the user, and the like.

When the surface is provided, the cassette and/or the dispense head may be held by the fluid dispensing apparatus. In other words, the cassette and/or dispense head is not released during the alignment verification procedure. Thus, the same cassette and/or dispense head may be used for subsequent runs of the alignment procedure.

If the alignment verification determines that the cassette holder is not properly aligned relative to the surface holder, the user may insert the surface back into the fluid dispensing apparatus. In one example, the previously dispensed fluid may be wiped out or dried off of the surface before re-inserting the surface. In another example, a new surface may be inserted.

After the fluid dispensing apparatus receives the surface, a user may enter adjustments via the GUI for a subsequent run of the alignment procedure. For example, the adjustments may specify how much to shift a location of the cassette holder and/or the surface holder for each location on the surface that receives the fluid during the alignment procedure.

The instructions 412 may include instructions to dispense the fluid onto the surface from the dispense head of the cassette. In one example, the alignment procedure may be executed again with the adjustments using the same cassette and dispense head. In other words, the dispense head is not replaced with a new dispense head each time the alignment procedure is executed. Rather, a single dispense head or the same dispense head may be used for each run of the alignment procedure.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A method, comprising:
   dispensing, by a processor, a fluid to an alignment location of a surface from a dispenser during an alignment procedure, wherein the dispenser comprises a releasable dispense head of a cassette;
   ejecting, by the processor, the surface for alignment verification;
   receiving, by the processor, the surface for re-execution of the alignment procedure after the alignment verification;
   re-using, by the processor, the dispenser to dispense fluid to the alignment location of the surface during re-execution of the alignment procedure, and performing the dispensing, ejecting, receiving, and re-using until the alignment verification is complete; and
   when the alignment procedure is complete, releasing, by the processor, the dispense head of the cassette used for the alignment procedure.

2. The method of claim 1, further comprising:
   holding, by the processor, the dispense head and the cassette during the ejecting.

3. The method of claim 1, further comprising:
   receiving, by the processor, an input that specifies a surface type that is being used for the alignment procedure.

4. The method of claim 3, wherein the fluid is dispensed onto the surface at a plurality of different locations that are determined based on the surface type.

5. A non-transitory computer readable storage medium encoded with instructions executable by a processor, the non-transitory computer-readable storage medium comprising:
   instructions to load an alignment process from a local memory for execution;
   instructions to dispense a fluid to an alignment location of a surface from a releasable dispense head of a cassette during an alignment procedure;
   instructions to receive an indication to repeat the alignment procedure after an alignment verification;
   instructions to dispense the fluid to the alignment location of the surface from the dispense head of the cassette during the repeat of the alignment procedure in response to the indication until the alignment procedure is complete; and
   instructions to release the dispense head of the cassette when the alignment procedure is complete.

6. The non-transitory computer readable storage medium of claim 5, wherein the receiving comprises:
   instructions to provide access to the surface; and
   instructions to receive the surface after the alignment verification.

7. The non-transitory computer readable storage medium of claim 5, further comprising:
   instructions to receive an input that specifies a surface type that is being used for the alignment procedure.

8. The non-transitory computer readable storage medium of claim 7, wherein the fluid is dispensed onto the surface at a plurality of different locations that are determined based on the surface type.

9. The non-transitory computer readable storage medium of claim 7, wherein the surface type comprises a microplate comprising a plurality of wells or an experimental surface.

10. The non-transitory computer readable storage medium of claim 5, further comprising:
   instructions to hold the dispense head and the cassette while the alignment verification is being performed.

11. An apparatus, comprising:
   a memory storing an alignment procedure;
   a cassette holder to hold a cassette comprising a releasable dispense head, wherein the releasable dispense head is useable during the alignment procedure; and
   a processor communicatively coupled to the memory, the cassette holder, and a surface holder, wherein the processor is configured to cause the releasable dispense head to dispense a fluid to an alignment location of a surface during the alignment procedure that aligns the cassette holder to the surface holder and holds the cassette during an alignment verification, wherein the processor is further configured to cause the releasable dispense head to be re-used during re-execution of the alignment procedure to dispense fluid to the alignment location of the surface, wherein the processor is configured to re-use the releasable dispense head during re-execution of the alignment procedure until the alignment procedure is complete, after which the processor is configured to cause the releasable dispense head to be released.

12. The apparatus of claim 11, wherein the memory comprises a read only memory.

* * * * *